(12) United States Patent
Tang

(10) Patent No.: US 11,381,356 B2
(45) Date of Patent: Jul. 5, 2022

(54) DATA TRANSMISSION METHOD AND TERMINAL

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 203 days.

(21) Appl. No.: 16/305,358

(22) PCT Filed: Aug. 26, 2016

(86) PCT No.: PCT/CN2016/096913
§ 371 (c)(1),
(2) Date: Nov. 28, 2018

(87) PCT Pub. No.: WO2018/010268
PCT Pub. Date: Jan. 18, 2018

(65) Prior Publication Data
US 2020/0322101 A1 Oct. 8, 2020

(30) Foreign Application Priority Data
Jul. 11, 2016 (CN) .............. PCT/CN2016/089701

(51) Int. Cl.
*H04L 1/18* (2006.01)
*H04L 5/00* (2006.01)
*H04W 72/04* (2009.01)

(52) U.S. Cl.
CPC .......... *H04L 1/1896* (2013.01); *H04L 1/1819* (2013.01); *H04L 5/0055* (2013.01);
(Continued)

(58) Field of Classification Search
CPC ...................................... H04L 1/1896
See application file for complete search history.

(56) References Cited

U.S. PATENT DOCUMENTS

2011/0299490 A1 12/2011 Nordstrom et al.
2012/0002593 A1 1/2012 Kim et al.
(Continued)

FOREIGN PATENT DOCUMENTS

CN 101132262 A 2/2008
CN 101252422 A 8/2008
(Continued)

OTHER PUBLICATIONS

International Search Report for corresponding application PCT/CN2016/096913 filed on Aug. 26, 2016; dated Mar. 29, 2017.
(Continued)

*Primary Examiner* — Jamaal Henson
*Assistant Examiner* — Andrew C Lee
(74) *Attorney, Agent, or Firm* — Ladas & Parry LLP

(57) ABSTRACT

Provided are a data transmission method and a terminal. In the method, a terminal receives Downlink Control Information (DCI) sent by a network side device; the terminal detects downlink data sent by the network side device based on the DCI; and the terminal determines, according to an index of a time element for transmitting downlink information or according to a time element offset between the time element for transmitting the downlink information and a time element for transmitting feedback information corresponding to the downlink data, a resource index of a target uplink control channel resource for transmitting the feedback information, the downlink information including at least one of the DCI and the downlink data.

19 Claims, 6 Drawing Sheets

(52) U.S. Cl.
CPC ..... *H04W 72/042* (2013.01); *H04W 72/0413* (2013.01); *H04W 72/0453* (2013.01)

(56) References Cited

U.S. PATENT DOCUMENTS

| | | | | |
|---|---|---|---|---|
| 2012/0113910 A1* | 5/2012 | Jen | ................... | H04L 1/1854 370/329 |
| 2012/0213163 A1 | 8/2012 | Lee | | |
| 2013/0121278 A1* | 5/2013 | Noh | ................... | H04W 72/04 370/329 |
| 2013/0188591 A1* | 7/2013 | Ko | ................... | H04B 7/0639 370/329 |
| 2013/0265962 A1* | 10/2013 | Ouchi | ................... | H04W 72/02 370/329 |
| 2014/0036810 A1* | 2/2014 | Harrison | ................... | H04L 5/0094 370/329 |
| 2014/0050165 A1* | 2/2014 | Park | ................... | H04L 1/1854 370/329 |
| 2014/0105155 A1* | 4/2014 | Kim | ................... | H04W 72/0413 370/329 |
| 2014/0153532 A1* | 6/2014 | Nogami | ................... | H04W 72/0406 370/329 |
| 2014/0241298 A1* | 8/2014 | Park | ................... | H04L 1/1854 370/329 |
| 2015/0139103 A1* | 5/2015 | Yang | ................... | H04L 5/0055 370/329 |
| 2015/0146639 A1* | 5/2015 | Seo | ................... | H04L 5/0053 370/329 |
| 2015/0256316 A1* | 9/2015 | Seo | ................... | H04W 76/27 370/329 |
| 2015/0382379 A1* | 12/2015 | Kim | ................... | H04W 74/006 370/329 |
| 2016/0127106 A1* | 5/2016 | Nogami | ................... | H04L 5/0053 370/329 |
| 2016/0165640 A1* | 6/2016 | Yang | ................... | H04W 74/08 370/336 |
| 2016/0337839 A1* | 11/2016 | Chae | ................... | H04L 5/14 |
| 2018/0167170 A1* | 6/2018 | Kim | ................... | H04L 1/1893 |
| 2018/0176892 A1* | 6/2018 | Kim | ................... | H04W 72/0406 |
| 2019/0082453 A1* | 3/2019 | Lyu | ................... | H04W 72/0453 |

FOREIGN PATENT DOCUMENTS

| | | | |
|---|---|---|---|
| CN | 101442818 A | 5/2009 | |
| CN | 101971547 A | 2/2011 | |
| CN | 102577209 A | 7/2012 | |
| CN | 102946640 A | 2/2013 | |
| CN | 103384976 A | 11/2013 | |
| CN | 103684714 A | 3/2014 | |
| CN | 103684714 A | 3/2014 | |
| CN | 103812620 A | 5/2014 | |
| CN | 104041160 A | 9/2014 | |
| CN | 104704758 A | 6/2015 | |
| CN | 104737485 A | 6/2015 | |
| CN | 104756570 A | 7/2015 | |
| CN | 104767595 A | 7/2015 | |
| CN | 104769878 A | 7/2015 | |
| CN | 105391525 A | 3/2016 | |
| WO | WO2013055174 A2 | 4/2013 | |
| WO | WO-2013180935 A1 * | 12/2013 | ............... H04B 7/26 |
| WO | WO-2013183749 A1 * | 12/2013 | ........... H04L 1/0026 |
| WO | 2014049169 A1 | 4/2014 | |
| WO | 2014068394 A1 | 5/2014 | |

OTHER PUBLICATIONS

International Search Report for priority application PCT/CN2016/089701 filed on Jul. 11, 2016; dated Mar. 30, 2017.
Extended European Search Report for EP application No. 16908593.3 dated Apr. 15, 2019.
The first examination report of the corresponding IN patent application No. 201817046804, dated Aug. 29, 2020.
3GPP TS 36.213V13.5.0 (Mar. 2017), Release 13, "Physical uplink control channel procedures", 81 pages.
3GPP TSG-RAN WG1 Meeting #70bis R1-124190 San Diego, CA, US, Oct. 13-17, 2012.
The first Office Action of the comesponding CN patent application No. 201060085936.6, dated Aug. 23, 2019.
The first Office Action of the corresponding TW patent application No. 106121767, dated Sep. 27, 2019.
The first examination report of the corresponding EP patent application No. 16908593.3, dated Mar. 9, 2020.
The first Office Action of the CN patent application No. 201911399654.5, dated Apr. 27, 2021.
Third Chinese Office Action with an English translation dated Oct. 21, 2021 for Chinese Application No. 201911399654.5, (12 pages).
Chinese second office action,Chinese Application No. 201911399654.5, dated Aug. 4, 2021 (10 pages).
Chinese First office action,Chinese Application No. 201911399651.1, dated Mar. 31, 2022 (11 pages).
Chinese First office action,Chinese Application No. 201911402433.9, dated Apr. 8, 2022 (15 pages).
Notification to Grant Patent Right for Invention.Chinese Application No. 201911399654.5, dated Mar. 2, 2022 (6 pages).

* cited by examiner

DATA TRANSMISSION METHOD AND TERMINAL

The present application is an application under 35 U.S.C. 371 of PCT Patent Application No. PCT/CN 2016/096913 filed Aug. 26, 2016 which claims priority to PCT Patent Application No. PCT/CN2016/089701, filed with the Chinese Patent Office on Jul. 11, 2016, and entitled "Data Transmission Method and Terminal Device", the entire contents of each of which are hereby incorporated by reference in its their entirety.

TECHNICAL FIELD

The present disclosure relates to a technical field of communications, and in particular to a data transmission method and a terminal.

BACKGROUND

In the fifth generation (5G) of mobile communication technologies, higher requirements are placed on data transmission delay and reliability. Especially for an Ultra-Reliable Low-latency Communication (URLLC) service, a short transmission delay (for example, about 0.5 ms) and a high transmission reliability are required. In order to meet the short delay requirement and improve the flexibility of configuration, in the current 5G research, a timing relationship between downlink data transmission and corresponding Hybrid Automatic Repeat reQuest (HARQ) feedback can be configured directly by a network side device. In this solution, the time differences between the data transmission and the corresponding HARQ of different User Equipment (UEs) may be different, that is, the HARQ for the data transmission scheduled by the network side device in different Transmission Time Intervals (TTIs) may be fed back in the same TTI. As a result, Physical Uplink Control Channel (PUCCH) resources used for the HARQ feedback corresponding to the data transmission in different TTIs may collide within one TTI, making it difficult to ensure the reliability of data transmission.

SUMMARY

The embodiments of the present disclosure provide a data transmission method and a terminal, which can reduce the probability of collision between control channel resources used by multiple pieces of feedback information (within one time element), thereby improving the reliability of data transmission.

In at least one alternative embodiment, a data transmission method is provided. The method includes that: a terminal receives Downlink Control Information (DCI) sent by a network side device; the terminal detects downlink data sent by the network side device based on the DCI; and the terminal determines, according to an index of a time element for transmitting downlink information or according to a time element offset between the time element for transmitting the downlink information and a time element for transmitting feedback information corresponding to the downlink data, a resource index of a target uplink control channel resource for transmitting the feedback information, the downlink information including at least one of the DCI and the downlink data.

In this solution, the terminal may determine, according to different time element offsets, resource indexes of different uplink control channel resources. Similarly, the terminal may determine, according to indexes of different time elements, resource indexes of different uplink control channel resources. The probability of collision between control channel resources used by multiple pieces of feedback information can be reduced, thereby improving the reliability of data transmission.

Optionally, in an exemplary implementation of the at least one alternative embodiment, the operation that the terminal determines, according to the index of the time element for transmitting the downlink information or according to the time element offset between the time element for transmitting the downlink information and the time element for transmitting the feedback information corresponding to the downlink data, the resource index of the target uplink control channel resource for transmitting the feedback information may include that: the terminal determines the resource index according to frequency domain resource information of the downlink information and any one of the index of the time element for transmitting the downlink information and the time element offset between the time element for transmitting the downlink information and the time element for transmitting the feedback information corresponding to the downlink data; or, the terminal determines the resource index according to logic resource information of the downlink information and any one of the index of the time element for transmitting the downlink information and the time element offset between the time element for transmitting the downlink information and the time element for transmitting the feedback information corresponding to the downlink data.

In an exemplary implementation of the at least one alternative embodiment, the operation that the terminal determines, according to the index of the time element for transmitting the downlink information or according to the time element offset between the time element for transmitting the downlink information and the time element for transmitting the feedback information corresponding to the downlink data, the resource index of the target uplink control channel resource for transmitting the feedback information may include that: the terminal determines, according to the index of the time element for transmitting the downlink information or according to the time element offset between the time element for transmitting the downlink information and the time element for transmitting the feedback information, a starting position of an uplink control channel resource region; and the terminal determines the resource index according to the starting position of the uplink control channel resource region.

In this solution, the terminal may determine starting positions of different uplink control channel resource regions according to different time element offsets, so that the terminal can determine resource indexes of different uplink control channel resources according to the starting positions of different uplink control channel resource regions. Similarly, the terminal may determine starting positions of different uplink control channel resource regions according to indexes of different time elements, so that the terminal can determine resource indexes of different uplink control channel resources according to the starting positions of different uplink control channel resource regions. The probability of collision between control channel resources used by multiple pieces of feedback information can be reduced, thereby improving the reliability of data transmission.

In an exemplary implementation of the at least one alternative embodiment, the operation that the terminal determines the resource index according to the starting position of the uplink control channel resource region may include that: the terminal determines the resource index according to the starting position of the uplink control channel resource region and any one of an index of a first CCE for transmitting the downlink information and a starting position of a frequency domain resource for transmitting the downlink information.

In this solution, if time element offsets (or indexes of time elements) corresponding to multiple pieces of downlink information are different, regardless of whether indexes of first CCEs (or starting positions of frequency domain resources) corresponding to the multiple pieces of downlink information are the same, the terminal may determine multiple different resource indexes according to multiple different time element offsets (or indexes of time elements) corresponding to the multiple pieces of downlink information. If time element offsets (or indexes of time elements) corresponding to multiple pieces of downlink information are the same, and indexes of first CCEs (or starting positions of frequency domain resources) corresponding to the multiple pieces of downlink information are different, the terminal may determine multiple different resource indexes according to indexes of different first CCEs (or starting positions of frequency domain resources) corresponding to the multiple pieces of downlink information and the time element offsets (or indexes of time elements) corresponding to the multiple pieces of downlink information. This solution can avoid the phenomenon of collision between control channel resources used by multiple pieces of feedback information, thereby improving the reliability of data transmission.

In an exemplary implementation of the at least one alternative embodiment, the operation that the terminal determines, according to the index of the time element for transmitting the downlink information or according to the time element offset between the time element for transmitting the downlink information and the time element for transmitting the feedback information corresponding to the downlink data, the resource index of a target uplink control channel resource for transmitting the feedback information may include that: the terminal determines the resource index according to one of the following formulas:

$$n_{PUCCH} = N_{PUCCH} + k \cdot N_{PUCCH_1} + n_{PRB} + B,$$

$$n_{PUCCH} = N_{PUCCH} + n \cdot N_{PUCCH_1} + n_{PRB} + B,$$

$$n_{PUCCH} = N_{PUCCH} + k \cdot N_{PUCCH_1} + n_{CCE} + B, \text{ and}$$

$$n_{PUCCH} = N_{PUCCH} + n \cdot N_{PUCCH_1} + n_{CCE} + B,$$

where $n_{PUCCH}$ is the resource index, $N_{PUCCH}$ is configured for the terminal by the network side device through a high layer signaling, n is the time element offset between the time element for transmitting the downlink information and the time element for transmitting the feedback information, $N_{PUCCH}$ is a number of uplink control channel resources reserved for data transmission in a single time element, $n_{PRB}$ is an index of a first Physical Resource Block (PRB) for transmitting the downlink information, $n_{CCE}$ is an index of a first CCE for transmitting the downlink information, B is an adjustment parameter, and k is the index of the time element for transmitting the downlink information.

In this solution, the terminal determines the resource index according to any one of the four formulas, so that the phenomenon of collision between control channel resources used by multiple pieces of feedback information can be avoided, thereby improving the reliability of data transmission. In addition, this solution is highly flexible, can be based on many optional parameters, and has higher compatibility, applicability and extendibility.

In the exemplary implementation of the at least one alternative embodiment, the feedback information may include ACK or NACK information.

In at least one alternative embodiment, a terminal for performing the method in the above at least one alternative embodiment or any exemplary implementation of the above at least one alternative embodiment is provided. In the embodiment, the terminal includes a module and/or unit for performing the method in the above at least one alternative embodiment or any exemplary implementation of the at least one alternative embodiment.

In at least one alternative embodiment, a terminal is provided. The terminal includes a transceiver, a memory, a processor, and a bus system. The transceiver, the memory and the processor are connected through the bus system, the memory is configured to store an instruction, the processor is configured to execute the instruction stored in the memory to control the transceiver to transmit and send a signal, and when the processor executes the instruction stored in the memory, the processor is enabled to perform the method in the above at least one alternative embodiment or any exemplary implementation of the at least one alternative embodiment.

In at least one alternative embodiment, a computer-readable storage medium for storing a computer program is provided, the computer program including an instruction for performing the method in the above at least one alternative embodiment or any exemplary implementation of the above at least one alternative embodiment.

Based on the above technical solution, the embodiments of the present disclosure provide a data transmission method and a terminal. The terminal may determine, according to an index of a time element for transmitting downlink information or according to a time element offset between the time element for transmitting the downlink information and a time element for transmitting feedback information, a resource index corresponding to the feedback information. The probability of collision of transmission of multiple pieces of feedback information in the same time element can be reduced. In addition, the terminal determines a resource index corresponding to the feedback information according to any one of the index of the time element and the time element offset and any one of frequency domain resource information for transmitting the downlink information and logic resource information for transmitting the downlink information. The phenomenon of collision between multiple pieces of feedback information in the same time element can be avoided.

BRIEF DESCRIPTION OF THE DRAWINGS

In order to more clearly illustrate the technical solutions of the embodiments of the present disclosure, the drawings to be used in the embodiments of the present disclosure will be briefly introduced below. It is apparent that the drawings described below are only some embodiments of the present disclosure. Those skilled in the art can also obtain other drawings based on these drawings without any creative work.

DETAILED DESCRIPTION OF THE EMBODIMENTS

Figure 1:
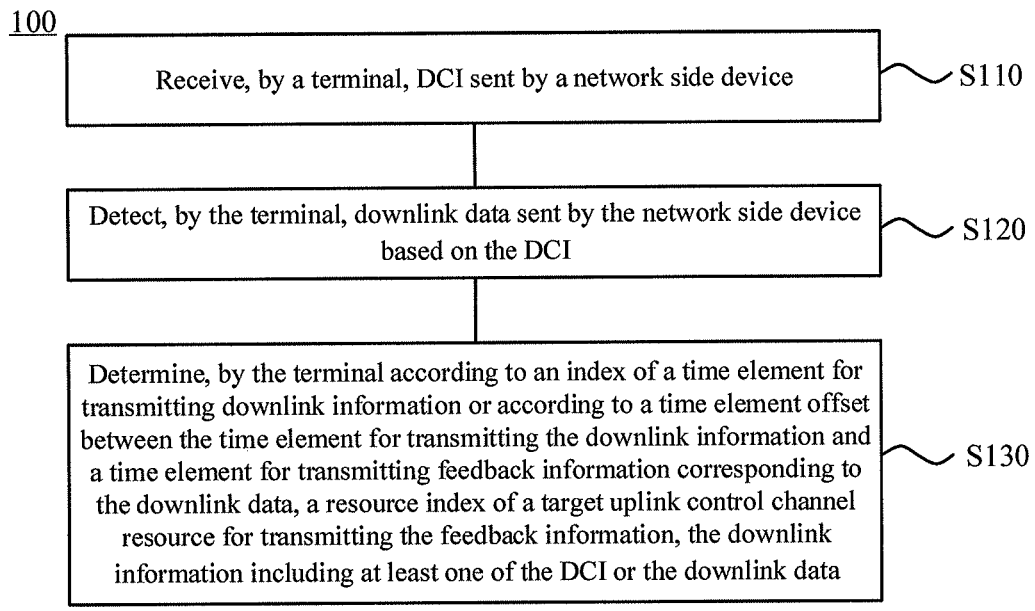
FIG. 1 is a schematic flowchart of a data transmission method according to an embodiment of the present disclosure.

The technical solutions in the embodiments of the present disclosure are clearly and completely described in the following with reference to the accompanying drawings in the embodiments of the present disclosure. It is apparent that the described embodiments are a part of the embodiments of the present disclosure, but not all of the embodiments. All other embodiments obtained by those skilled in the art based on the embodiments of the present disclosure without creative efforts shall fall within the scope of protection of the present disclosure.

The present disclosure describes various embodiments in conjunction with a terminal. The terminal may be referred to as a UE, a Mobile Station (MS), a mobile terminal, etc., and the terminal may communicate with one or more core networks through a Radio Access Network (RAN). As an example, the terminal may be a mobile phone (or a "cellular" phone), a computer with a mobile terminal, etc. As another example, the terminal may also be a portable, pocket-sized, hand-held, computer-integrated or in-vehicle mobile terminal or a terminal in a future 5G network that exchanges voice and/or data with the RAN.

In addition, the present disclosure describes various embodiments in conjunction with a network side device. The network side device may be a Long Term Evolution (LTE) system or an evolved system thereof or an Evolutional Node B (eNB or e-NodeB) in a future 5G network, a macro base station, a micro base station (also referred to as a "small base station"), a pico base station, an Access Point (AP), or a Transmission Point (TP), etc. This is not limited in the present disclosure.

It is to be understood that the technical solutions of the embodiments of the present disclosure may be applied to various communication systems such as LTE or 5G systems, and may also be applied to other communication systems.

It is also to be understood that symbols are referred to as Single Carrier-Frequency Division Multiple Access (SC-FDMA) symbols. If an Orthogonal Frequency Division Multiple Access (OFDMA) mode is introduced in a future 5G technology or an LTE technology, symbols may also be referred to as OFDM symbols, which is not limited in the embodiments of the present disclosure.

In the LTE or LTE-A system, or the future 5G system, from the time dimension, the time length of one radio frame is 10 ms, the time length of one subframe is 1 ms, and one radio frame includes 10 subframes. There are two subframe formats. One subframe format is a Normal Cyclic Prefix (NCP) subframe format, in which one NCP subframe includes 14 OFDM symbols or 2 slots. The OFDM symbols are numbered from 0 to 13, the OFDM symbols No. 0 to No. 6 are odd slots, and the OFDM symbols No. 7 to No. 13 are even slots. The other subframe format is an Extended Cyclic Prefix (ECP) subframe format, in which one ECP subframe includes 12 OFDM symbols or 2 slots. The OFDM symbols are numbered from 0 to 11, the OFDM symbols No. 0 to No. 5 are odd slots, and the OFDM symbols No. 6 to No. 11 are even slots.

From the frequency dimension, the smallest element is a subcarrier. From both the time dimension and the frequency dimension, the smallest element for a resource used for transmission at an antenna port is a Resource Element (RE). One RE includes one OFDM symbol in a time domain and one subcarrier in a frequency domain. One Resource-Element Group (REG) may include an integer number of REs, for example, one REG may include 4 or 16 REs. One PRB includes one slot in the time domain and 12 subcarriers in the frequency domain. One subframe includes one PRB pair. One Resource Block (RB) includes one subframe in the time domain and 12 subcarriers in the frequency domain. One Resource Block Group (RBG) may include an integer number of PRBs, for example, one RBG may include one, two, three, four, or other integer number of PRBs.

It is also to be understood that physical resources in the embodiments of the present disclosure may include time domain resources and frequency domain resources. In the time domain, the resource occupies M symbols, where M is a positive integer greater than or equal to 1. In the frequency domain, the resource occupies N frequency domain elements, and each frequency domain element includes K consecutive subcarriers, where N is a positive integer greater than or equal to 1, and K is a positive integer greater than or equal to 2. The physical resource may further include at least one of a time domain resource, a frequency domain resource, a code domain resource, and a space domain resource.

FIG. 1 is a schematic flowchart of a data transmission method according to an embodiment of the present disclosure. As shown in FIG. 1, the data transmission method 100 includes the following operations shown in blocks S110 to S130.

In block S110, a terminal receives DCI sent by a network side device.

In block S120, the terminal detects downlink data sent by the network side device based on the DCI.

In block S130, the terminal determines, according to an index of a time element for transmitting downlink information or according to a time element offset between the time element for transmitting the downlink information and a time element for transmitting feedback information corresponding to the downlink data, a resource index of a target uplink control channel resource for transmitting the feedback information, the downlink information including at least one of the DCI and the downlink data.

In the embodiment, the time element may be a subframe, a slot (including a shortened slot), an OFDM symbol, a TTI (including a shortened TTI), or other time domain resource element for identifying a time domain physical resource. The index of the time element for transmitting the downlink information is the index of the time element for transmitting the downlink information in an upper time element. For example, if a time element is a subframe, an index of the time element may be an index of a subframe of the downlink information (such as DCI) in a radio frame. The time element offset may be the number of time elements which are present between a time element occupied by a downlink control channel for transmitting the downlink information (such as DCI) and a time element occupied by an uplink control channel carrying the feedback information. The resource index of the target uplink control channel resource may be an index of the uplink control channel resource occupied by the feedback information in a predefined uplink control channel resource pool. For the sake of brevity, the "index of the time element for transmitting the downlink information" is simply referred to as "index of time element", and the "time element offset between the time element for transmitting the downlink information and the time element for transmitting the feedback information" is simply referred to as "time element offset".

It is to be noted that the feedback information may be used for HARQ feedback, and may include ACK/NACK information.

The terminal may receive DCI sent by the network side device, and detect downlink data sent by the network side device based on the DCI, determine a detection result of the downlink data, and send feedback information to the network side device according to the detection result, so as to notify the network side device of whether the terminal correctly receives the downlink data. The terminal may determine, according to the time element offset or the index of the time element, a resource index of the target uplink control channel resource for transmitting the feedback information.

In this solution, the terminal determines, according to the index of the transmission time element and the time element offset, the resource index, so that the probability of collision between control channel resources used by multiple pieces of feedback information can be reduced, thereby improving the reliability of data transmission. The downlink information including the DCI is taken as an example. The terminal receives DCI1 and DCI2 sent by the network side device. An index of a time element for transmitting DCI1 is $k_1$, and an index of a time element for transmitting DCI2 is $k_2$ ($k_1$ and $k_2$ are not equal). According to HARQ timing, feedback information B corresponding to downlink data A detected based on DCI1 and feedback information D corresponding to downlink data C detected based on DCI2 are transmitted in the same time element (such as a time element with an index of $k_3$), and the terminal may determine resource indexes of different uplink control channel resources according to indexes ($k_1$ and $k_2$) of different time elements. For another example, the downlink information including downlink data is taken as an example. The terminal receives downlink data A and downlink data C sent by the network side device. A time element offset corresponding to the downlink data A is $n_1$, and a time element offset corresponding to the downlink data C is $n_2$ ($n_1$ and $n_2$ are not equal). If according to HARQ timing, feedback information B corresponding to the downlink data A and feedback information D corresponding to the downlink data C are transmitted in the same time element (such as a time element with an index of $k_3$), the time element offset $n_j$ corresponding to the downlink data A and the time element offset $n_2$ corresponding to the downlink data C are different, and the terminal may determine resource indexes of different uplink control channel resources according to different time element offsets.

For another example, the downlink information including the DCI and the downlink data is taken as an example. If the DCI and the downlink data are transmitted in the same time element, an index of a time element for transmitting DCI1 and downlink data A is $k_1$, and an index of a time element for transmitting DCI2 and downlink data C is $k_2$ ($k_1$ and $k_2$ are not equal), according to HARQ timing, feedback information B corresponding to the downlink data A and feedback information D corresponding to the downlink data C are transmitted in the same time element (such as a time element with an index of $k_3$), and the terminal may determine resource indexes of different uplink control channel resources according to indexes ($k_1$ and $k_2$) of different time elements.

In the data transmission method 100 according to the embodiment of the present disclosure, the terminal may determine, according to the time element offset of the downlink information or the index of the time element for the downlink information, the resource index of the target uplink control channel resource for the feedback information. The probability of collision of HARQ feedback of different downlink data within one time element can be reduced, thereby improving the reliability of HARQ feedback. In addition, compared with the resource index of the target uplink control channel resource for the feedback information configured by the network side device, the data transmission method 100 may associate the uplink control channel resource with time domain resource information of the downlink information (such as the index of the time element for transmitting the downlink information), so that the signaling overhead can be reduced.

It is to be noted that the DCI may be carried on the downlink control channel, and may alternatively be carried on the downlink data channel or other channels. This is not limited in the present disclosure.

Optionally, in the embodiments of the present disclosure, as an example rather than limitation, the time element offset may be carried in the downlink information. For example, when the downlink information includes DCI, assuming that the maximum allowed time element offset between the DCI and the feedback information is N, a time element offset between the DCI and the feedback information may be indicated by log 2(N)-bit information in the DCI. Similarly, when the downlink information includes downlink data, a time element offset between the downlink data and the feedback information may be indicated by log 2(N)-bit information in the downlink data. The time element offset may also be pre-agreed by the terminal and the network side device. The time element offset may alternatively be internally stored in the terminal. The time element offset may alternatively be randomly determined by the terminal. The time element offset may alternatively be obtained by the terminal in other ways.

Optionally, in the embodiments of the present disclosure, as an example rather than limitation, if the downlink information includes DCI, the time element offset between the DCI and the feedback information may also be carried in the downlink data.

The above is a detailed description given in combination with FIG. 1 illustrating that the terminal may determine, according to the time element offset or an index of the time element, a resource index of the target uplink control channel resource for the feedback information. The following is a detailed description of how the terminal determines, according to the time element offset or the index of the time element, a resource index of the uplink control channel resource, so as to further improve the reliability of HARQ feedback.

Mode 1

In the embodiments of the present disclosure, as an example rather than limitation, the terminal determines a starting position $k_{start}$ of the uplink control channel resource region according to the index of the time element for transmitting the downlink information or according to the time element offset between the time element for transmitting the downlink information and the time element for transmitting the feedback information.

The terminal determines the resource index according to the starting position $N_{start}$ of the uplink control channel resource region.

Optionally, in the embodiment of the present disclosure, as an example rather than limitation, the starting position of the uplink control channel resource region is $N_{start}=N_{PUCCH}+n \cdot N_{PUCCH_1}$, where $N_{PUCCH}$ is configured for the terminal by the network side device through a high layer signaling ($N_{PUCCH}$ may be a preset resource starting position of an uplink control channel for transmitting ACK/NACK, and $N_{PUCCH}$ may be 0); n is the time element offset; $N_{PUCCH_1}$ is the resource number of uplink control channel resources reserved for data transmission in a single time element (or the resource size of uplink control channel resources); and $N_{PUCCH_1}$ is generally pre-agreed by the network side device and the terminal or pre-indicated by the network side device to the terminal. The high layer signaling message may include a Radio Resource Control (RRC) message.

Optionally, in the embodiment of the present disclosure, as an example rather than limitation, the starting position of the uplink control channel resource region is $N_{start}=N_{PUCCH}+k \cdot N_{PUCCH_1}$ where k is an index of the time element, and $N_{PUCCH}$ and $N_{PUCCH_1}$ may refer to the related description above.

After the terminal determines the starting position of the uplink control channel resource region, the resource index may be acquired by the following manners.

(1) The terminal may determine the resource index according to the starting position $N_{start}$ of the uplink control channel resource region and an index of a CCE for transmitting the downlink information (such as an index of a first CCE).

(2) The terminal may determine the resource index according to the starting position $N_{start}$ of the uplink control channel resource region and a starting position of a frequency domain resource for transmitting the downlink information. The starting position of the frequency domain resource of the downlink information may include an index of the first PRB in at least one PRB for transmitting the downlink information, the starting position of the frequency domain resource of the downlink information may alternatively include an index of the first REG in at least one REG for transmitting the downlink information, the starting position of the frequency domain resource of the downlink information may alternatively include an index of the first RBG in at least one RBG for transmitting the downlink information, and the starting position of the frequency domain resource may alternatively include other information, which is not limited herein in the present disclosure.

For example, when the downlink information includes DCI, the network side device may schedule, by using DCI carried on a downlink control channel such as a Physical Downlink Control Channel (PDCCH), a terminal to perform downlink data transmission, wherein the PDCCH occupies the $m^{th}$ subframe in one radio frame, and a time element offset between the time element for transmitting the DCI and the time element for transmitting the feedback information is n.

The terminal detects the DCI and downlink data corresponding to the DCI, and determines feedback information (ACK/NACK) according to whether the downlink data is correctly detected.

The terminal may determine, according to the time element offset n, that the starting position of the uplink control channel resource is $N_{start}=n \cdot N_{PUCCH_1}$ (the network side device is not configured with $N_{PUCCH}$, or $N_{PUCCH}=0$).

The operation that terminal determines, according to the starting position $N_{start}$, that the resource index $n_{PUCCH}$ of the uplink control channel resource may be:

$n_{PUCCH}=n \cdot N_{PUCCH_1}+n_{CCE}+B$, or $n_{PUCCH}=n \cdot N_{PUCCH_1}+n_{PRB}+B$.

The terminal reports the feedback information by using the uplink control channel resource corresponding to $n_{PUCCH}$ in the uplink control channel resource region on the $m+n^{th}$ subframe. $N_{PUCCH_1}$ may refer to the related description above. $n_{CCE}$ is an index of the first CCE occupied by the DCI, $n_{PRB}$ is an index of the first PRB in PRBs occupied by the DCI, and B is another adjustment parameter (for example, B may be equal to 1).

For example, when the downlink information includes the downlink data, the network side device may schedule, by using DCI in a downlink control channel (such as a PDCCH), a terminal to perform downlink data transmission, where the downlink data occupies the $m^{th}$ subframe in one radio frame, and the index of the $m^{th}$ subframe in the radio frame is m−1.

The terminal detects the DCI and downlink data corresponding to the DCI, and determines feedback information (e.g., ACK/NACK) according to whether the downlink data is correctly detected.

The terminal may determine, according to the index m−1, that the starting position of the uplink control channel resource may be $N_{start}=(m-1) \cdot N_{PUCCH_1}$.

The operation that the terminal determines, according to the starting position $N_{start}$, that the resource index $n_{PUCCH}$ of the uplink control channel resource may be:

$n_{PUCCH}=(m-1) \cdot N_{PUCCH_1}+n_{CCE}+B$, or $n_{PUCCH}=(m-1) \cdot N_{PUCCH_1}+n_{PRB}+B$.

The terminal reports the feedback information by using the uplink control channel resource corresponding to $n_{PUCCH}$ in the uplink control channel resource region on m−1+b subframes. b is a fixed value pre-agreed by the network side device and the terminal, $n_{CCE}$ is the index of the first CCE occupied by the downlink data, and $n_{PRB}$ is the index of the first PRB in PRBs occupied by the downlink data.

It is to be noted that the index of the first CCE for transmitting the downlink information (or the starting position of the frequency domain resource for transmitting the downlink information) may be predetermined by the terminal, or may be notified to the terminal by the network side device, or may be determined after the terminal acquires the index of the time element (or a time element offset), which will not be limited herein.

It is also to be noted that the index of the first CCE occupied by the downlink information may refer to the index of the first CCE in at least one CCE for transmitting the downlink information.

Optionally, as an example, if the downlink information includes the DCI and the downlink data, the DCI and the downlink data are transmitted in the same time element, and the index of the first CCE of the downlink information may include the index of the first CCE occupied by the DCI and the downlink data. For example, the index of the first CCE occupied by the DCI is $N_1$, and the index of the first CCE occupied by the uplink data is $N_2$. If $N_1 < N_2$, the index of the first CCE occupied by the DCI and the uplink data is $N_1$.

Optionally, as an example, if the downlink information includes the DCI and the downlink data, the DCI and the downlink data are transmitted in the same time element, and the starting position of the frequency domain resource of the downlink information may include the starting position of the frequency domain resource occupied by the DCI and the uplink data. For example, the starting position of the frequency domain resource occupied by the DCI is the first position, and the starting position of the frequency domain resource occupied by the uplink data is the second position. If the first position is before the second position, the starting position of the frequency domain resource occupied by the DCI and the uplink data is the first position.

Mode 2

In the embodiment of the present disclosure, as an example rather than limitation, the terminal determines the resource index according to any one of the following formulas (1) to (4):

$$n_{PUCCH} = N_{PUCCH} + k \cdot N_{PUCCH_1} + n_{PRB} + B \quad (1)$$

$$n_{PUCCH} = N_{PUCCH} + n \cdot N_{PUCCH_1} + n_{PRB} B \quad (2)$$

$$n_{PUCCH} = N_{PUCCH} + k \cdot N_{PUCCH_1} + n_{CCE} + B \quad (3)$$

$$n_{PUCCH} = N_{PUCCH} + n \cdot N_{PUCCH_1} + n_{CCE} + B \quad (4)$$

where $n_{PUCCH}$ is the resource index, $N_{PUCCH}$ and $N_{PUCCH_1}$ may refer to the related description above, n is the time element offset between the time element for transmitting the downlink information and the time element for transmitting the feedback information, k is the index of the time element for transmitting the downlink information, $n_{PRB}$ is an index of a first PRB for transmitting the downlink information, $n_{CCE}$ is an index of a first CCE for transmitting the downlink information, and B is an adjustment parameter.

Optionally, as an example, the value of $N_{PUCCH_1}$ may be designed to make $n_{PRB}$ smaller than $N_{PUCCH_1}$ (for example, $N_{PUCCH_1}$ may take a larger value). Similarly, the value of $N_{PUCCH_1}$ may be designed to make $n_{CCE}$ smaller than $N_{PUCCH_1}$.

In the embodiment, the terminal may determine the resource index according to any one of the foregoing formulas (1) to (4), and collision of multiple pieces of feedback information within one transmission time unit can be avoided, thereby improving the reliability of HARQ feedback.

Formula (1) is taken as an example. When the downlink information includes DCI, it is assumed that the terminal receives DCI 1 and DCI2 sent by the network side device. An index of a time element for transmitting DCI1 is $k_1$, and an index of a time element for transmitting DCI2 is $k_2$. Feedback information B corresponding to downlink data A detected based on DCI1 and feedback information D corresponding to downlink data C detected based on DCI2 are transmitted in the same time element. A first resource index of the uplink control channel resource for transmitting the feedback information B is $n_{PUCCH1} = N_{PUCCH} + k_1 \cdot N_{PUCCH_1} + n_{PRB1} + B$. A second resource index of the uplink control channel resource for transmitting the feedback information D is $n_{PUCCH2} = N_{PUCCH} + k_2 \cdot N_{PUCCH_1} + n_{PRB2} + B$. $n_{PRB1}$ is an index of the first PRB for transmitting DCI1, and $n_{PRB2}$ is an index of the first PRB for transmitting DCI2. Both $n_{PRB1}$ and $n_{PRB2}$ are smaller than $N_{PUCCH_1}$ (referring to the related description above).

Figure 2:
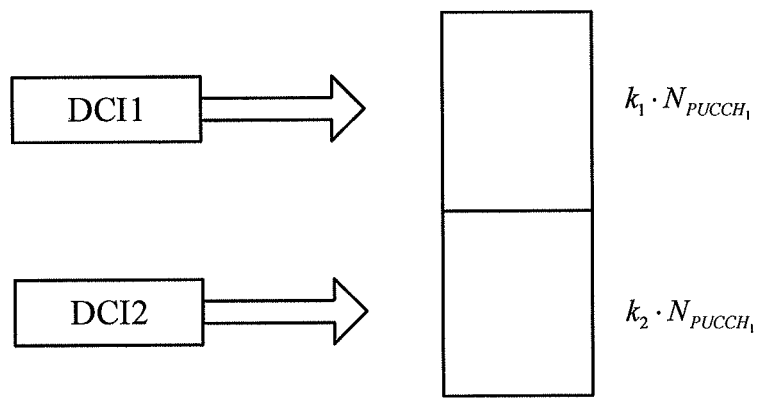
FIG. 2 is a diagram showing a resource area of an uplink control channel resource according to an embodiment of the present disclosure.

FIG. 2 is a diagram showing a resource area of an uplink control channel resource according to an embodiment of the present disclosure. As shown in FIG. 2, if $k_1$ and $k_2$ are different, $n_{PUCCH1}$ and $n_{PUCCH2}$ are different regardless of whether $n_{PRB1}$ and $n_{PRB2}$ are the same. For example, $k_1 - k_2 = N$, $N \geq 1$, $n_{PUCCH1} - n_{PUCCH2} = (k_1 - k_2) \cdot N_{PUCCH_1} + n_{PRB1} - n_{PRB2}$), since $n_{PRB1}$ and $n_{PRB2}$ are both smaller than $N_{PUCCH_1}$, $(n_{PRB1} - n_{PRB2})$ is smaller than $N_{PUCCH_1}$, $N_{PUCCH_1}$ is different from $n_{PUCCH2}$.

Figure 3:
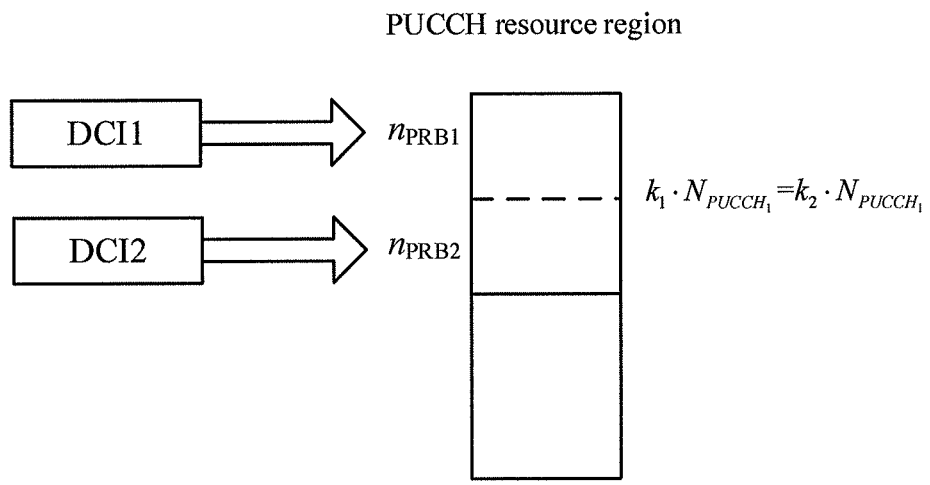
FIG. 3 is a diagram showing a resource area of an uplink control channel resource according to another embodiment of the present disclosure.

FIG. 3 is a diagram showing a resource area of an uplink control channel resource according to another embodiment of the present disclosure. As shown in FIG. 3, if $k_1$ and $k_2$ are the same, DCI1 and DCI2 are transmitted in the same time element. $n_{PRB1}$ of DCI1 is different from $n_{PRB2}$ of DCI2 (since DCI1 and DCI2 occupy the same time element, the two DCIs occupy at least one different frequency domain resource and time domain resource to ensure that DCI1 and DCI2 are correctly transmitted, and therefore, the starting positions of the frequency domain resources for transmitting DCI1 and DCI2 are different, that is, the indexes of the first PRBs for transmitting DCI1 and DCI2 are different). Therefore, $n_{PUCCH1}$ is different from $n_{PUCCH2}$.

Formula (2) is taken as an example. When the downlink information includes DCI, it is assumed that the terminal receives DCI1 and DCI2 sent by the network side device. A time element offset corresponding to DCI1 is $n_1$, and a time element offset corresponding to DCI2 is $n_2$. Feedback information B corresponding to downlink data A detected based on DCI1 and feedback information D corresponding to downlink data C detected based on DCI2 are transmitted in the same time element. A first resource index of the uplink control channel resource for transmitting the feedback information B is $n_{PUCCH1} = N_{PUCCH} + n_1 \cdot N_{PUCCH_1} + n_{CCE1} + B$. A second resource index of the uplink control channel resource for transmitting the feedback information D is $n_{PUCCH2} = N_{PUCCH} + n_2 \cdot N_{PUCCH_1} + B$. $n_{CCE1}$ is an index of the first CCE for transmitting DCI1, and $n_{CCE2}$ is an index of the first CCE for transmitting DCI2. Both $n_{CCE1}$ and $n_{CCE2}$ are smaller than $N_{PUCCH_1}$.

Figure 4:
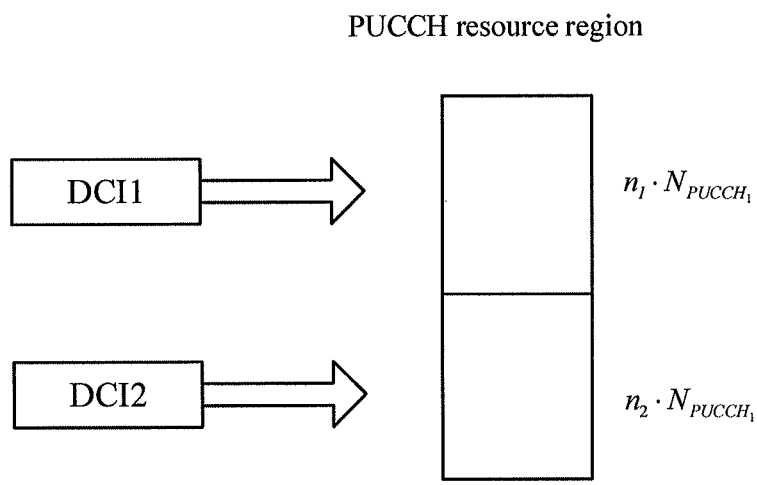
FIG. 4 is a diagram showing a resource area of an uplink control channel resource according to yet another embodiment of the present disclosure.

FIG. 4 is a diagram showing a resource area of an uplink control channel resource according to yet another embodiment of the present disclosure. As shown in FIG. 4, if $n_1$ and $n_2$ are different, $n_{PUCCH1}$ and $n_{PUCCH2}$ are different regardless of whether $n_{CCE1}$ and $n_{CCE2}$ are the same. For example, $n_1 - n_2 = N$, $N \geq 1$, $n_{PUCCH1} - n_{PUCCH2} = (n_1 - n_2) \cdot N_{PUCCH_1} + n_{CCE1} - n_{CCE2}$), since $n_{CCE1}$ and $n_{CCE2}$ are both smaller than $N_{PUCCH_1}$, $(n_{CCE1} - n_{CCE2})$ is smaller than $n_{PUCCH1}$, $n_{PUCCH1}$ is different from $n_{PUCCH2}$.

Figure 5:
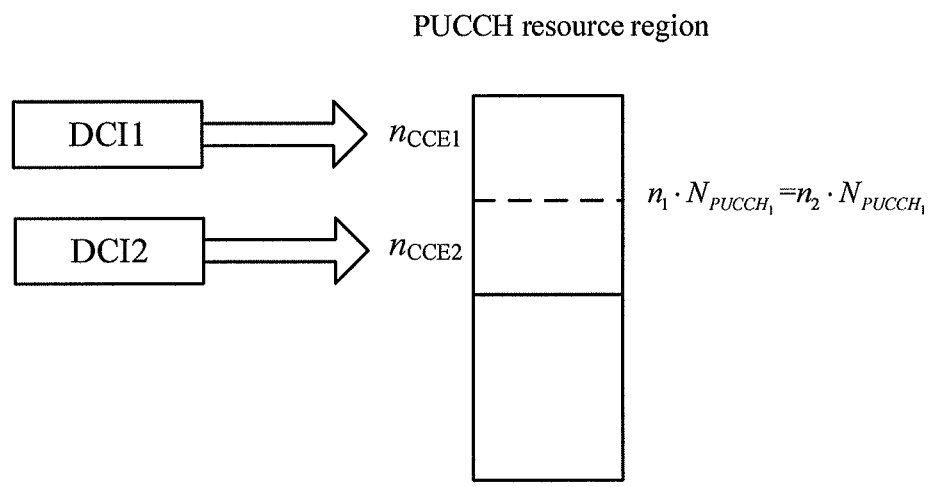
FIG. 5 is a diagram showing a resource area of an uplink control channel resource according to a further embodiment of the present disclosure.

FIG. 5 is a diagram showing a resource area of an uplink control channel resource according to yet another embodiment of the present disclosure. As shown in FIG. 5, if $n_1$ and $n_2$ are the same, the feedback information B and the feedback information D are transmitted in the same time element, and DCI1 and DCI2 are transmitted by the same time element. Therefore, $n_{CCE1}$ of DCI1 is different from $n_{CCE2}$ of DCI2 (since DCI1 and DCI2 occupy the same time element, the two DCIs occupy at least one different frequency domain resource and time domain resource to ensure that DCI1 and DCI2 are correctly transmitted, and therefore, the index of the first CCE for transmitting DCI1 is different from the index of the first CCE for transmitting DCI2). Thus, $n_{PUCCH1}$ is different from $n_{PUCCH2}$.

Formula (3) is taken as an example. When the downlink information includes downlink data, it is assumed that the terminal receives downlink data A and downlink data C sent by the network side device. A time element offset corresponding to the downlink data A is $n_3$, and a time element offset corresponding to the downlink data B is $n_4$. Feedback information B corresponding to the downlink data A and feedback information D corresponding to the downlink data C are transmitted in the same time element. A first resource index of the uplink control channel resource for transmitting the feedback information B is $n_{PUCCH1}=N_{PUCCH}+n_3 \cdot N_{PUCCH_1}+n_{PRB3}+B$. A second resource index of the uplink control channel resource for transmitting the feedback information D is $n_{PUCCH2}=N_{PUCCH}+n_4 \cdot N_{PUCCH_1}+n_{PRB4}+B$. $n_{PRB4}$ is an index of the first PRB for transmitting the downlink data A, $n_{PRB4}$ is an index of the first PRB for transmitting the downlink data C, and both $n_{PRB3}$ and $n_{PRB4}$ are smaller than $N_{PUCCH_1}$.

Figure 6:
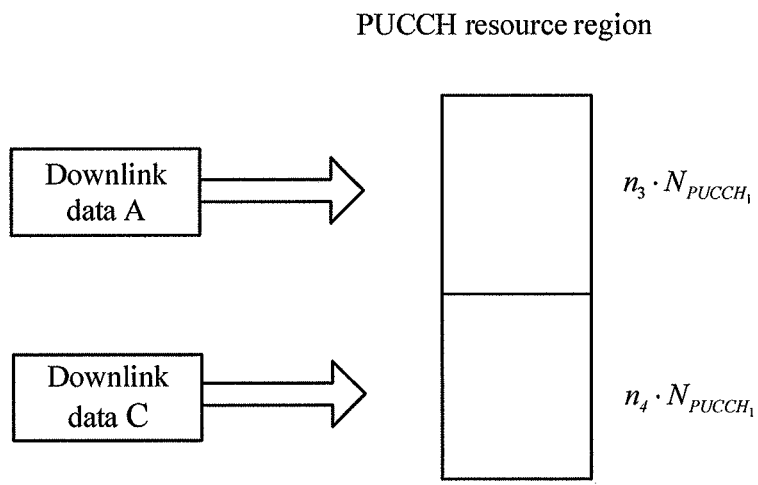
FIG. 6 is a diagram showing a resource area of an uplink control channel resource according to a further embodiment of the present disclosure.

FIG. 6 is a diagram showing a resource area of an uplink control channel resource according to another embodiment of the present disclosure. As shown in FIG. 6, if $n_3$ and $n_4$ are different, $N_{PUCCH_1}$ and $n_{PUCCH2}$ are different regardless of whether $n_{PRB3}$ and $n_{PRB4}$ are the same (referring to the related description above).

Figure 7:
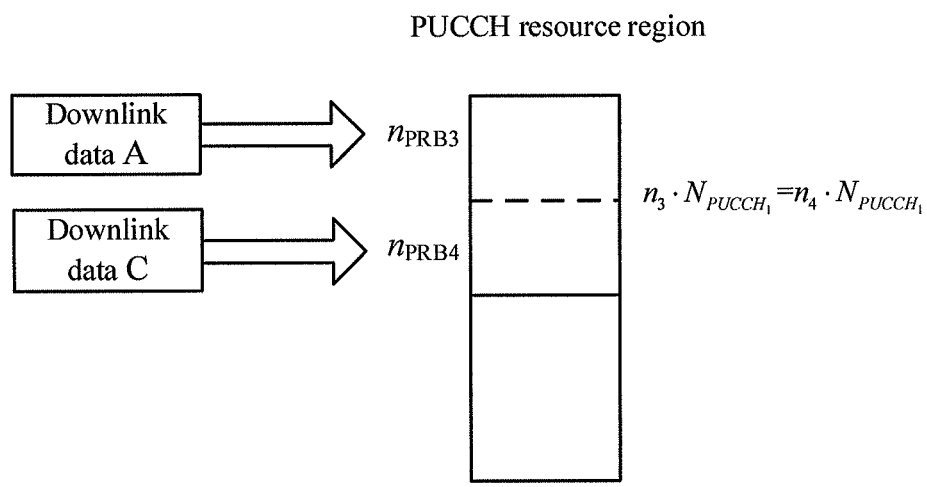
FIG. 7 is a diagram showing a resource area of an uplink control channel resource according to a further embodiment of the present disclosure.

FIG. 7 is a diagram showing a resource area of an uplink control channel resource according to another embodiment of the present disclosure. As shown in FIG. 7, if $n_3$ and $n_4$ are the same, the downlink data A and the downlink data C are transmitted in the same time element. $n_{PRB3}$ of the downlink data A and $n_{PRB4}$ of the downlink data C are different (referring to the related description above), and $n_{PUCCH_1}$ is different from $n_{PUCCH2}$.

Formula (4) is taken as an example. When the downlink information includes downlink data, it is assumed that the terminal receives downlink data A and downlink data C sent by the network side device. An index of a time element for transmitting the downlink data A is $k_3$, and an index of a time element for transmitting DCI2 is Feedback information B corresponding to the downlink data A and feedback information D corresponding to the downlink data C are transmitted in the same time element. A first resource index of the uplink control channel resource for transmitting the feedback information B is $n_{PUCCH1}=N_{PUCCH}+k_3 \cdot N_{PUCCH_1}+n_{CCE3}+B$. A second resource index of the uplink control channel resource for transmitting the feedback information D is $n_{PUCCH2}=N_{PUCCH_1}+k_4 \cdot N_{PUCCH_1}+n_{CCE4}+B$. $n_{CCE3}$ is an index of the first CCE for transmitting the downlink data A, $n_{CCE4}$ is an index of the first CCE for transmitting the downlink data C, and both $n_{CCE3}$ and $n_{CCE4}$ are smaller than $n_{PUCCH1}$.

Figure 8:
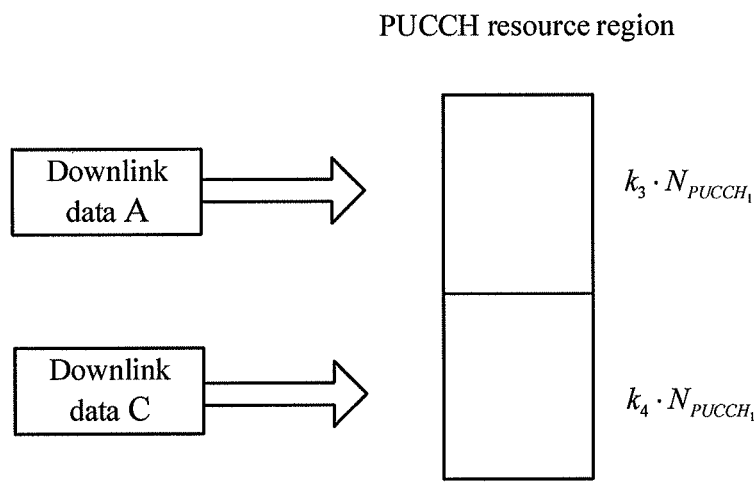
FIG. 8 is a diagram showing a resource area of an uplink control channel resource according to a further embodiment of the present disclosure.

FIG. 8 is a diagram showing a resource area of an uplink control channel resource according to yet another embodiment of the present disclosure. As shown in FIG. 8, if $k_3$ and $k_4$ are different, $n_{PUCCH1}$ and $n_{PUCCH2}$ and are different regardless of whether $n_{CCE3}$ and $n_{CCE4}$ are the same (referring to the related description above).

Figure 9:
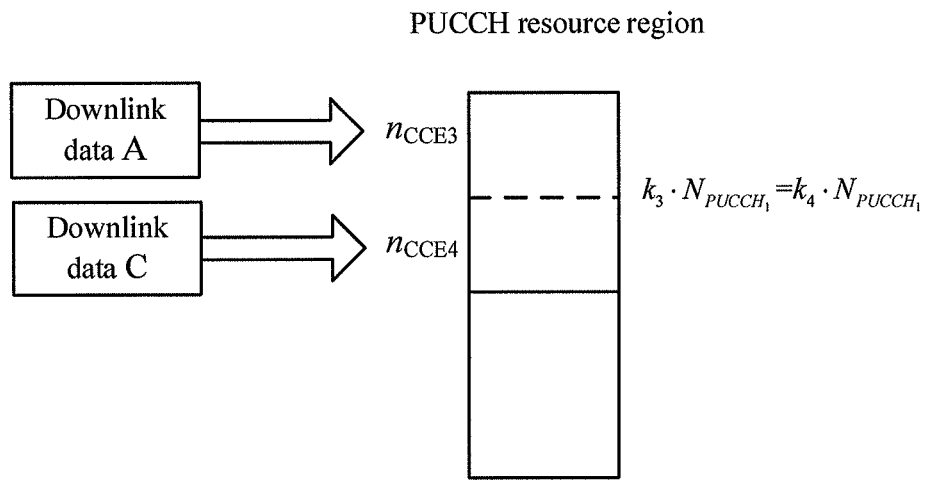
FIG. 9 is a diagram showing a resource area of an uplink control channel resource according to a further embodiment of the present disclosure.

FIG. 9 is a diagram showing a resource area of an uplink control channel resource according to another embodiment of the present disclosure. As shown in FIG. 9, if $k_3$ and $k_4$ are the same, the downlink data A and the downlink data C are transmitted in the same time element. $n_{CCE3}$ of the downlink data A is different from $n_{CCE4}$ of the downlink data C (referring to the related description above), and $n_{PUCCH1}$ is different from $n_{PUCCH2}$.

In this solution, the resource index is determined by any one of the formulas (1) to (4), which can avoid the phenomenon of collision of multiple pieces of feedback information in the same time unit, and can improve the reliability of feedback information.

Optionally, as an example, in the embodiment of the present disclosure, the downlink information includes the DCI and the downlink data, the DCI and the downlink data are transmitted in the same time element, and the terminal may determine, according to any one of the starting position of the frequency domain resource occupied by the DCI and the downlink data and the index of the first CCE occupied by the downlink data, a resource index of the target uplink control channel resource for transmitting the feedback information.

For example, an index of a time element for transmitting DCI1 and downlink data A is $k_1$, an index of a time element for transmitting DCI2 and downlink data C is $k_2$, a first resource index of an uplink control channel resource for transmitting feedback information B is $n_{PUCCH1}=N_{PUCCH}+k_1 \cdot N_{PUCCH_1}+n_{PRB1}+B$, a second resource index of an uplink control channel resource for transmitting feedback information D is $n_{PUCCH2}=N_{PUCCH}+k_2 \cdot N_{PUCCH_1}+n_{PRB2}+B$, $n_{PRB1}$ DCI1 and the downlink data A occupy the index of the first PRB, and $n_{PRB2}$ DCI2 and the downlink data C occupy the index of the first PRB. Both $n_{PRB1}$ and $n_{PRB2}$ are smaller than $N_{PUCCH_1}$ (referring to the related description above). Based on the above description, $N_{PUCCH_1}$ and $n_{PUCCH2}$ are different regardless of whether $k_1$ and $k_2$ are the same.

It is to be noted that when the downlink information includes the DCI and the uplink data, the related description for determining the resource index by the terminal may refer to the related description that the downlink information includes the DCI or the downlink data. Details are not repeated herein for brevity.

It is to be noted that in the case that the terminal determines the resource index according to the logic resource information of the downlink information, the logic resource information may include other logic resource information in addition to or instead of the index of the first CCE. For example, the logic resource information may additionally or alternatively include an index of the last CCE occupied by the downlink information. Similarly, in the case that the terminal determines the resource index according to the frequency domain resource information of the downlink information, the frequency domain resource information may include other frequency domain resource information in addition to or instead of the starting position of the frequency domain resource occupied by the downlink information. For example, the frequency domain resource information may additionally or alternatively include the end position of the frequency domain resource occupied by the downlink information.

Optionally, as an example, in the embodiment of the present disclosure, the terminal may determine a resource index of the target uplink control channel resource for transmitting the feedback information according to any one of the following manners:

(1) The resource index is determined according to an index of a time element for transmitting the DCI and an index of a first CCE for transmitting the DCI.

(2) The resource index is determined according to an index of a time element for transmitting the DCI and a starting position of a frequency domain resource for transmitting the DCI.

(3) The resource index is determined according to a time element offset between the time element for transmitting the DCI and the time element for transmitting the feedback information, and an index of a first CCE for transmitting the DCI.

(4) The resource index is determined according to a time element offset between the time element for transmitting the downlink information and the time element for transmitting the feedback information, and a starting position of a frequency domain resource for transmitting the DCI.

(5) The resource index is determined according to an index of a time element for transmitting the downlink data and an index of a first CCE for transmitting the downlink data.

(6) The resource index is determined according to an index of a time element for transmitting the downlink data and a starting position of a frequency domain resource for transmitting the downlink data.

(7) The resource index is determined according to a time element offset between the time element for transmitting the downlink data and the time element for transmitting the feedback information, and an index of a first CCE for transmitting the downlink data.

(8) The resource index is determined according to a time element offset between the time element for transmitting the downlink data and the time element for transmitting the feedback information, and a starting position of a frequency domain resource for transmitting the downlink data (such as an index of a first PRB).

(9) The resource index is determined according to an index of a time element for transmitting the DCI and the downlink data and an index of a first CCE for transmitting the DCI and the downlink data.

(10) The resource index is determined according to an index of a time element for transmitting the DCI and the downlink data and a starting position of a frequency domain resource for transmitting the DCI and the downlink data.

(11) The resource index is determined according to a time element offset between the time element for transmitting the DCI and the downlink data and the time element for transmitting the feedback information, and an index of a first CCE for transmitting the DCI and the downlink data.

(12) The resource index is determined according to a time element offset between the time element for transmitting the DCI and the downlink data and the time element for transmitting the feedback information, and a starting position of a frequency domain resource for transmitting the DCI and the downlink data.

It is to be noted that in practical application, the manner for determining the resource index may be set according to a protocol or an agreement, and the present disclosure is not limited herein.

Therefore, in the data transmission method 100 according to the embodiment of the present disclosure, the data transmission method 100 may determine the resource index according to the time domain resource information of the downlink information (such as an index of the transmission time element for the downlink information or a time element offset). The probability of collision of HARQ feedback within one time element can be reduced, and the signaling overhead is reduced, thereby improving the reliability of HARQ feedback. In addition, the data transmission method 100 may determine the resource index according to the time domain resource information of the downlink information and the frequency domain resource information (or the logic resource information), thereby further reducing the probability of collision of HARQ feedback within one time element. The method has high compatibility and can be applied to multiple scenarios. The method has high extensibility, and can efficiently determine resource indexes of uplink control channel resources that meet the requirements for different application scenarios.

Figure 10:
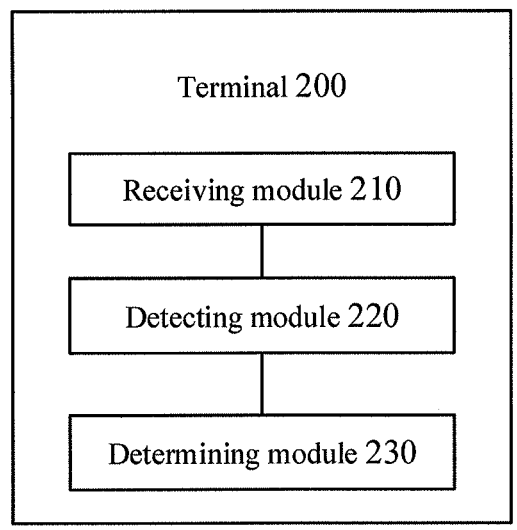
FIG. 10 is a schematic block diagram of a terminal according to an embodiment of the present disclosure.

The data transmission method 100 according to the embodiment of the present disclosure is described in detail above with reference to FIG. 1 to FIG. 9. The terminal of the embodiment of the present disclosure is described in detail below with reference to FIG. 10 and FIG. 11. FIG. 10 is a schematic block diagram of a terminal 200 according to an embodiment of the present disclosure. As shown in FIG. 10, a terminal 200 is provided. The terminal 200 includes a receiving module 210, a detecting module 220 and a determining module 230.

The receiving module 210 is configured to receive DCI sent by a network side device.

The detecting module 220 is configured to detect downlink data sent by the network side device based on the DCI.

The determining module 230 is configured to determine, according to an index of a time element for transmitting downlink information or according to a time element offset between the time element for transmitting the downlink information and a time element for transmitting feedback information corresponding to the downlink data, a resource index of a target uplink control channel resource for transmitting the feedback information, the downlink information including at least one of the DCI and the downlink data.

In this solution, the terminal 200 may determine, according to different time element offsets, resource indexes of different uplink control channel resources. Similarly, the terminal 200 may determine, according to indexes of different time elements, resource indexes of different uplink control channel resources. The probability of collision between control channel resources used by multiple pieces of feedback information can be reduced, thereby improving the reliability of data transmission.

Optionally, as an example, the determining module 230 is configured to:

determine, according to the index of the time element for transmitting the downlink information or according to the time element offset between the time element for transmitting the downlink information and the time element for transmitting the feedback information, a starting position of an uplink control channel resource region; and determine the resource index according to the starting position of the uplink control channel resource region.

Optionally, as an example, the determining module 230 is configured to determine the resource index according to the starting position of the uplink control channel resource region and any one of an index of a first CCE for transmitting the downlink information and a starting position of a frequency domain resource for transmitting the downlink information.

Optionally, as an example, the determining module 230 is configured to determine the resource index according to one of the following formulas:

$$n_{PUCCH} = N_{PUCCH} + k \cdot N_{PUCCH_1} + n_{PRB} + B,$$

$$n_{PUCCH} = N_{PUCCH} + n \cdot N_{PUCCH_1} + n_{PRB} + B,$$

$$n_{PUCCH} = N_{PUCCH} + k \cdot N_{PUCCH_1} + n_{CCE} + B, \text{ and}$$

$$n_{PUCCH} = N_{PUCCH} + n \cdot N_{PUCCH_1} + n_{CCE} + B,$$

where $n_{PUCCH}$ is the resource index, $N_{PUCCH}$ is configured for the terminal by the network side device through a high layer signaling, n is the time element offset between the time element for transmitting the downlink information and the time element for transmitting the feedback information, $N_{PUCCH_1}$ is a number of uplink control channel resources reserved for data transmission in a single time element, $n_{PRB}$ is an index of a first PRB for transmitting the downlink information, $n_{CCE}$ is an index of a first CCE for transmitting the downlink information, B is an adjustment parameter, and k is the index of the time element for transmitting the downlink information.

Optionally, as an example, the downlink information carries a time element offset between the time element for transmitting the downlink information and a time element for transmitting the feedback information.

The terminal may determine, according to an index of a time element for transmitting downlink information or according to a time element offset between the time element for transmitting the downlink information and a time element for transmitting feedback information, a resource index corresponding to the feedback information. The probability of collision of transmission of multiple pieces of feedback information in the same time element can be reduced. In addition, the terminal determines, according to any one of the index of the time element and the time element offset and any one of frequency domain resource information for transmitting the downlink information and logic resource information for transmitting the downlink information, a resource index corresponding to the feedback information. The phenomenon of collision between multiple pieces of feedback information in the same time element can be avoided.

It is to be noted that the index of the time element, the transmission time element and the starting position of the uplink control channel resource region may be referred to the related description in the implementations shown in FIG. 1 to FIG. 9 above, and details are not repeated herein.

It is to be noted that the terminal 200 may correspond to the data transmission method according to an embodiment of the present disclosure, and each module in the terminal 200 and the other operations or functions described above are respectively intended to implement the corresponding processes performed by the terminal in various embodiments as shown in FIG. 1 to FIG. 9, and details are not repeated herein for brevity.

Figure 11:
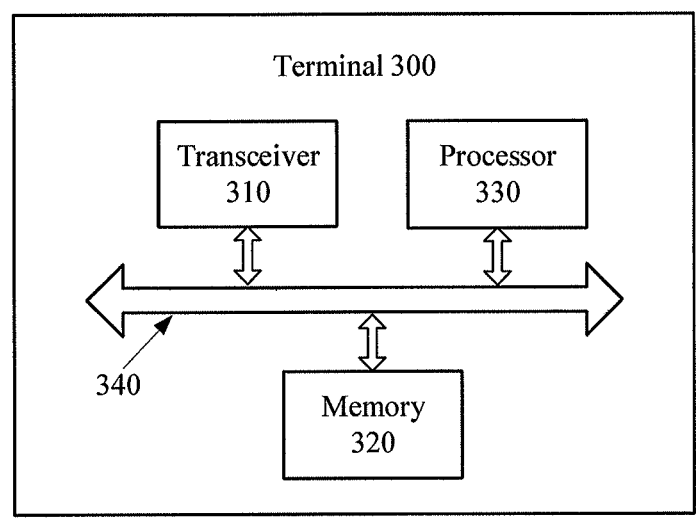
FIG. 11 is a schematic block diagram of a terminal according to another embodiment of the present disclosure.

FIG. 11 is a terminal according to another embodiment of the present disclosure. As shown in FIG. 11, a terminal 300 includes:

a transceiver 310, a memory 320, a processor 330, and a bus system 340. The transceiver 310, the memory 320 and the processor 330 are connected through the bus system 340, the memory 320 is configured to store an instruction, the processor 330 is configured to execute the instruction stored in the memory 320 to control the transceiver 310 to transmit and send a signal, and the processor 330 is configured to control the transceiver to:

receive DCI sent by a network side device.

The processor 330 is further configured to:

detect downlink data sent by the network side device based on the DCI; and determine, according to an index of a time element for transmitting downlink information or according to a time element offset between the time element for transmitting the downlink information and a time element for transmitting feedback information corresponding to the downlink data, a resource index of a target uplink control channel resource for transmitting the feedback information, the downlink information including at least one of the DCI and the downlink data.

In this solution, the terminal 200 may determine, according to different time element offsets, resource indexes of different uplink control channel resources. Similarly, the terminal 200 may determine, according to indexes of different time elements, resource indexes of different uplink control channel resources. The probability of collision between control channel resources used by multiple pieces of feedback information can be reduced, thereby improving the reliability of data transmission.

Optionally, as an example, the processor 330 is configured to:

determine, according to the index of the time element for transmitting the downlink information or according to the time element offset between the time element for transmitting the downlink information and the time element for transmitting the feedback information, a starting position of an uplink control channel resource region; and determine the resource index according to the starting position of the uplink control channel resource region.

Optionally, as an example, the processor 330 is configured to determine the resource index according to the starting position of the uplink control channel resource region and any one of an index of a first CCE for transmitting the downlink information and a starting position of a frequency domain resource for transmitting the downlink information.

Optionally, as an example, the processor 330 is configured to determine the resource index according to one of the following formulas:

$$n_{PUCCH}=N_{PUCCH}+k \cdot N_{PUCCH_1}+n_{PRB}+B,$$

$$n_{PUCCH}=N_{PUCCH}+n \cdot N_{PUCCH_1}+n_{PRB}+B,$$

$$n_{PUCCH}=N_{PUCCH}+k \cdot N_{PUCCH_1}+n_{CCE}+B, \text{ and}$$

$$n_{PUCCH}=N_{PUCCH}+n \cdot N_{PUCCH_1}+n_{CCE}+B,$$

where $n_{PUCCH}$ is the resource index, $N_{PUCCH}$ is configured for the terminal by the network side device through a high layer signaling, n is the time element offset between the time element for transmitting the downlink information and the time element for transmitting the feedback information, $N_{PUCCH_1}$ is a number of uplink control channel resources reserved for data transmission in a single time element, $n_{PRB}$ is an index of a first Physical Resource Block (PRB) for transmitting the downlink information, $n_{CCE}$ is an index of a first CCE for transmitting the downlink information, B is an adjustment parameter, and k is the index of the time element for transmitting the downlink information.

Optionally, as an example, the downlink information carries a time element offset between the time element for transmitting the downlink information and a time element for transmitting the feedback information.

The terminal may determine, according to an index of a time element for transmitting downlink information or according to a time element offset between the time element for transmitting the downlink information and a time element for transmitting feedback information, a resource index corresponding to the feedback information. The probability of collision of transmission of multiple pieces of feedback information in the same time element can be reduced. In addition, the terminal determines, according to any one of the index of the time element and the time element offset and any one of frequency domain resource information for transmitting the downlink information and logic resource information for transmitting the downlink information, a resource index corresponding to the feedback information. The phenomenon of collision between multiple pieces of feedback information in the same time element can be avoided.

It is to be noted that the index of the time element, the transmission time element and the starting position of the uplink control channel resource region may be referred to the related description in the implementations shown in FIG. 1 to FIG. 9 above, and details are not repeated herein.

It is to be noted that the terminal 300 may correspond to the data transmission method according to an embodiment of the present disclosure, and each module in the terminal 300 and the other operations or functions described above are respectively intended to implement the corresponding processes performed by the terminal in various embodiments as shown in FIG. 1 to FIG. 9, and details are not repeated herein for brevity.

It is to be understood that in the embodiment of the present disclosure, the processor 330 may be a general-purpose Central Processing Unit (CPU), a microprocessor, an Application Specific Integrated Circuit (ASIC), or one or more integrated circuits configured to execute the related program to implement the technical solution provided by the embodiment of the present disclosure.

The transceiver 310 can realize communication between a mobile terminal and other devices or communication networks.

The memory 320 may include a Read-Only Memory (ROM) and a Random Access Memory (RAM) and provides instructions and data to the processor 330. A portion of the processor 330 may also include a non-volatile RAM. For example, the processor 330 may also store information of a device type.

The bus system 340 may further include a power bus, a control bus, a status signal bus or the like in addition to a data bus. However, for clarity of description, various buses are labeled as the bus system 340 in the figure. In the implementation process, each step of the above method may be implemented by an integrated logic circuit of hardware or an instruction in the form of software. Various steps of the data transmission method disclosed in the embodiment of the present disclosure may be directly implemented as being independently performed by a hardware processor, or may be performed by a combination of hardware and software modules in the processor. The software module may be located in a mature storage medium such as a random access memory, a flash memory, a read only memory, a programmable read only memory or an electrically erasable programmable memory, and a register. The storage medium is located in the memory 320, and the processor 330 reads information in the memory 320 and completes the steps of the above method in combination with hardware thereof. To avoid repetition, no descriptions will be made herein.

It is also to be understood that in the embodiment of the present disclosure, "B corresponding to A" means that B is associated with A, and B can be determined from A. However, it is also to be understood that determining B from A does not mean that B is determined merely from A, and that B can also be determined from A and/or other information. It is to be understood that the term "and/or" herein is merely an association describing associated objects, indicating that there may be three relationships. For example, A and/or B may indicate that A exists separately, both A and B exist simultaneously, and B exists separately. In addition, the character "/" herein generally indicates that the contextual object is an "or" relationship.

It is to be understood that in various embodiments of the present disclosure, the size of the sequence numbers of the above processes does not mean the order of execution, and the order of execution of each process should be determined by its function and internal logic, and should not make any limitation to the implementation process of the embodiment of the present disclosure.

Those of ordinary skill in the art will appreciate that the units and algorithm steps of various examples described in combination with the embodiments disclosed herein can be implemented in electronic hardware or a combination of computer software and electronic hardware. Whether these functions are performed in hardware or software depends on the specific application and design constraints of the technical solution. Those skilled in the art can use different methods for implementing the described functions for each particular application, but such implementation should not be considered to be beyond the scope of the present disclosure.

Those skilled in the art can clearly understand that for the convenience and brevity of the description, the specific working process of the system, apparatus and unit described above may refer to the corresponding process in the foregoing method embodiment, and details are not repeated herein.

In several embodiments provided by the present application, it is to be understood that the disclosed system, apparatus and method may be implemented in other manners. For example, the apparatus embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed may be indirect coupling or communication connection between apparatuses or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the present disclosure may be integrated into one processing unit, or each unit may exist physically separately, or two or more units may be integrated into one unit.

The technical features and descriptions in the above embodiments are applicable to other embodiments in order to make the application documents simple and clear. For example, the technical features of the method embodiments may be applied to apparatus embodiments or other method embodiments, and will not be repeated in other embodiments.

The functions may be stored in a computer-readable storage medium if being implemented in the form of a software functional unit and sold or used as a standalone product. Based on such understanding, the essence of the technical solution of the present disclosure or a part contributing to the conventional art or a part of the technical solution may be embodied in the form of a software product stored in a storage medium, including a plurality of instructions used to cause a computer device (which may be a personal computer, server, or network device, etc.) to perform all or part of the steps of the methods described in various embodiments of the present disclosure. The foregoing storage medium includes: a U disk, a mobile hard disk, a ROM, a RAM, a magnetic disk, or an optical disk, and the like, which may store a program code.

The above is only the specific implementation of the present disclosure, but the scope of protection of the present disclosure is not limited thereto. Any person skilled in the art can easily think of changes or replacements within the technical scope disclosed by the present disclosure, which should be covered by the scope of protection of the present disclosure. Therefore, the scope of protection of the present disclosure should be determined by the scope of the claims.

What is claimed is:

1. A data transmission method, comprising:
receiving, by a terminal, Downlink Control Information (DCI) sent by a network side device;
detecting, by the terminal, downlink data sent by the network side device based on the DCI; and
determining, by the terminal according to a time element offset between a time element for transmitting the downlink control information and a time element for transmitting feedback information corresponding to the downlink data, a resource index of a target uplink control channel resource for transmitting the feedback information;
wherein the downlink control information carries the time element offset between the time element for transmitting the downlink control information and the time element for transmitting the feedback information;
wherein determining, by the terminal according to the time element offset between the time element for transmitting the downlink control information and the time element for transmitting the feedback information corresponding to the downlink data, the resource index of the target uplink control channel resource for transmitting the feedback information comprises:
determining, by the terminal, the resource index according to one of the following formulas:

$n_{PUCCH} = N_{PUCCH} + k \cdot N_{PUCCH_1} + n_{PRB} + B$, $n_{PUCCH} = N_{PUCCH} + n \cdot N_{PUCCH_1} + n_{PRB} + B$, $n_{PUCCH} = N_{PUCCH} + k \cdot N_{PUCCH_1} + n_{CCE} + B$, and $n_{PUCCH} = N_{PUCCH} + n \cdot N_{PUCCH_1} + n_{CCE} + B$, where $n_{PUCCH}$ is the resource index, $N_{PUCCH}$ is configured for the terminal by the network side device through a high layer signaling, n is the time element offset between the time element for transmitting the downlink control information and the time element for transmitting the feedback information, $N_{PUCCH_1}$ is a number of uplink control channel resources reserved for data transmission in a single time element, $n_{PRB}$ is an index of a first Physical Resource Block (PRB) for transmitting the downlink control information, $n_{CCE}$ is an index of a first CCE for transmitting the downlink control information, B is an adjustment parameter, and k is the index of the time element for transmitting the downlink control information.

2. The method as claimed in claim 1, wherein determining, by the terminal according to the time element offset between the time element for transmitting the downlink control information and the time element for transmitting the feedback information corresponding to the downlink data, the resource index of the target uplink control channel resource for transmitting the feedback information comprises:
determining, by the terminal according to the time element offset between the time element for transmitting the downlink control information and the time element for transmitting the feedback information, a starting position of an uplink control channel resource region; and
determining, by the terminal, the resource index according to the starting position of the uplink control channel resource region.

3. The method as claimed in claim 2, wherein determining, by the terminal, the resource index according to the starting position of the uplink control channel resource region comprises:
determining, by the terminal, the resource index according to the starting position of the uplink control channel resource region and any one of an index of a first Control Channel Element (CCE) for transmitting the downlink control information and a starting position of a frequency domain resource for transmitting the downlink control information.

4. The method as claimed in claim 3, wherein the starting position of the frequency domain resource of the downlink control information comprises one of:
an index of a first Physical Resource Block (PRB) in at least one PRB for transmitting the downlink control information;
an index of a first Resource-Element Group (REG) in at least one REG for transmitting the downlink control information;
an index of a first Resource Block Group (RBG) in at least one RBG for transmitting the downlink control information.

5. The method as claimed in claim 3, wherein the index of the first CCE for transmitting the downlink control information or the starting position of the frequency domain resource for transmitting the downlink control information is predetermined by the terminal, or is notified to the terminal by the network side device, or is determined after the terminal acquires the index of the time element or the time element offset.

6. The method as claimed in claim 2, wherein determining, by the terminal according to the time element offset between the time element for transmitting the downlink control information and the time element for transmitting the feedback information, the starting position of the uplink control channel resource region comprises:
determining the starting position $N_{start}$ based on $N_{start} = N_{PUCCH} + n \cdot N_{PUCCH_1}$, where $N_{PUCCH}$ is configured for the terminal by the network side device through a high layer signaling, n is the time element offset between the time element for transmitting the downlink control information and the time element for transmitting the feedback information, $N_{PUCCH_1}$ is a number of uplink control channel resources reserved for data transmission in a single time element; or,
determining the starting position $N_{start}$ based on $N_{start} = N_{PUCCH} \pm k \cdot N_{PUCCH_1}$, where $N_{PUCCH}$ is configured for the terminal by the network side device through a high layer signaling, k is the index of the time element for transmitting the downlink control information, $N_{PUCCH_1}$ is a number of uplink control channel resources reserved for data transmission in a single time element.

7. The method as claimed in claim 1, wherein the time element offset between the time element for transmitting the downlink control information and the time element for transmitting the feedback information corresponding to the downlink data is pre-agreed by the terminal and the network side device, or is internally stored in the terminal, or is randomly determined by the terminal.

8. The method as claimed in claim 1, wherein if the downlink control information comprises the DCI, the time element offset between the time element for transmitting the downlink control information and the time element for transmitting the feedback information corresponding to the downlink data carried in the downlink data.

9. The method as claimed in claim 1, wherein determining, by the terminal according to the time element offset between the time element for transmitting the downlink control information and the time element for transmitting the feedback information corresponding to the downlink data, the resource index of the target uplink control channel resource for transmitting the feedback information comprises:
  determining, by the terminal, the resource index according to frequency domain resource information of the downlink control information and any one of the index of the time element for transmitting the downlink control information and the time element offset between the time element for transmitting the downlink control information and the time element for transmitting the feedback information corresponding to the downlink data; or,
  determining, by the terminal, the resource index according to logic resource information of the downlink control information and any one of the index of the time element for transmitting the downlink control information and the time element offset between the time element for transmitting the downlink control information and the time element for transmitting the feedback information corresponding to the downlink data.

10. The method as claimed in claim 9, wherein the frequency domain resource information comprises at least one of a starting position of a frequency domain resource occupied by the downlink control information and an end position of a frequency domain resource occupied by the downlink control information.

11. The method as claimed in claim 9, wherein the logic resource information comprises at least one of an index of a first CCE occupied by the downlink control information and an index of a last CCE occupied by the downlink control information.

12. The method as claimed in claim 1, wherein the feedback information comprises ACK or NACK information.

13. The method as claimed in claim 1, wherein $N_{PUCCH}$ is a preset resource starting position of an uplink control channel for transmitting ACK/NACK.

14. The method as claimed in claim 1, wherein $n_{PRB}$ is smaller than $N_{PUCCH}$.

15. The method as claimed in claim 1, wherein $n_{CCE}$ is smaller than $N_{PUCCH}$.

16. A terminal, comprising: a hardware processor coupled with a memory and configured to execute program instructions stored on the memory, wherein the program instructions comprise:
  receiving Downlink Control Information (DCI) sent by a network side device;
  detecting downlink data sent by the network side device based on the DCI; and
  determining, according to a time element offset between a time element for transmitting the downlink control information and a time element for transmitting feedback information corresponding to the downlink data, a resource index of a target uplink control channel resource for transmitting the feedback information;
  wherein the downlink control information carries the time element offset between the time element for transmitting the downlink control information and the time element for transmitting the feedback information;
  wherein the program instructions further comprise: determining the resource index according to one of the following formulas:

$$n_{PUCCH}=N_{PUCCH}+k\cdot N_{PUCCH_1}+n_{PRB}+B,$$

$$n_{PUCCH}=N_{PUCCH}+n\cdot N_{PUCCH_1}+n_{PRB}+B,$$

$$n_{PUCCH}=N_{PUCCH}+k\cdot N_{PUCCH_1}+n_{CCE}+B, \text{ and}$$

$$n_{PUCCH}=N_{PUCCH}+n\cdot N_{PUCCH_1}+n_{CCE}+B,$$

where $n_{PUCCH}$ is the resource index, $N_{PUCCH}$ is configured for the terminal by the network side device through a high layer signaling, n is the time element offset between the time element for transmitting the downlink information and the time element for transmitting the feedback information, $N_{PUCCH_1}$ is a number of uplink control channel resources reserved for data transmission in a single time element, $n_{PRB}$ is an index of a first Physical Resource Block (PRB) for transmitting the downlink control information, $n_{CCE}$ is an index of a first CCE for transmitting the downlink control information, B is an adjustment parameter, and k is the index of the time element for transmitting the downlink control information.

17. The terminal as claimed in claim 16, wherein the program instructions further comprise:
  determining, according to the time element offset between the time element for transmitting the downlink control information and the time element for transmitting the feedback information, a starting position of an uplink control channel resource region; and
  determining the resource index according to the starting position of the uplink control channel resource region.

18. The terminal as claimed in claim 17, wherein the program instructions further comprise: determining the resource index according to the starting position of the uplink control channel resource region and any one of an index of a first Control Channel Element (CCE) for transmitting the downlink control information and a starting position of a frequency domain resource for transmitting the downlink control information.

19. A network side device, comprising: a hardware processor coupled with a memory and configured to execute program instructions stored on the memory, wherein the program instructions comprise:
  sending Downlink Control Information (DCI) to a terminal, so that the terminal detects downlink data sent by the network side device based on the DCI; and
  determines according to a time element offset between a time element for transmitting the downlink control information and a time element for transmitting feedback information corresponding to the downlink data, a resource index of a target uplink control channel resource for transmitting the feedback information;
  wherein the downlink control information carries the time element offset between the time element for transmitting the downlink control information and the time element for transmitting the feedback information;

wherein determines according to a time element offset between the time element for transmitting the downlink control information and a time element for transmitting feedback information corresponding to the downlink data, a resource index of a target uplink control channel resource for transmitting the feedback information comprises:

determining the resource index according to one of the following formulas:

$$n_{PUCCH}=N_{PUCCH}+k \cdot N_{PUCCH_1}+n_{PRB}+B,$$

$$n_{PUCCH}=N_{PUCCH}+n \cdot N_{PUCCH_1}+n_{PRB}+B,$$

$$n_{PUCCH}=N_{PUCCH}+k \cdot N_{PUCCH_1}+n_{CCE}+B, \text{ and}$$

$$n_{PUCCH}=N_{PUCCH}+n \cdot N_{PUCCH_1}+n_{CCE}+B,$$

where $n_{PUCCH}$ is the resource index, $N_{PUCCH}$ is configured for the terminal by the network side device through a high layer signaling, n is the time element offset between the time element for transmitting the downlink control information and the time element for transmitting the feedback information, $N_{PUCCH_1}$ is a number of uplink control channel resources reserved for data transmission in a single time element, $n_{PRB}$ is an index of a first Physical Resource Block (PRB) for transmitting the downlink control information, $n_{CCE}$ is an index of a first CCE for transmitting the downlink control information, B is an adjustment parameter, and k is the index of the time element for transmitting the downlink control information.

* * * * *